US007873578B2

(12) United States Patent
Johnson et al.

(10) Patent No.: US 7,873,578 B2
(45) Date of Patent: Jan. 18, 2011

(54) BUY ONCE PLAY ANYWHERE

(75) Inventors: Jerry Alan Johnson, Medina, WA (US);
J. Clinton Paul Fowler, Seattle, WA (US); Jerry P. Hook, Bothell, WA (US);
Shyam Krishnamoorthy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 119 days.

(21) Appl. No.: 11/731,045

(22) Filed: Mar. 30, 2007

(65) Prior Publication Data
US 2008/0243694 A1 Oct. 2, 2008

(51) Int. Cl.
*G06F 21/00* (2006.01)

(52) U.S. Cl. .............................. 705/56; 705/51; 705/52; 705/53; 705/54; 705/55; 705/57; 705/58; 705/59; 380/201; 380/202; 380/203; 380/204; 380/227; 380/228; 380/229; 380/230; 726/4; 726/21; 726/27; 726/28

(58) Field of Classification Search ............. 705/51–59; 380/201–204, 227–230; 726/4, 21, 27, 28
See application file for complete search history.

(56) References Cited

U.S. PATENT DOCUMENTS

| 5,629,980 | A  |   | 5/1997  | Stefik et al. .................... 380/4    |
|-----------|----|---|---------|---------------------------------------------|
| 6,009,401 | A  |   | 12/1999 | Horstmann .................... 705/1        |
| 6,226,618 | B1 | * | 5/2001  | Downs et al. .................. 705/1       |
| 6,389,537 | B1 | * | 5/2002  | Davis et al. ................. 713/187     |
| 6,658,403 | B1 | * | 12/2003 | Kuroda et al. .................. 707/2     |
| 6,920,567 | B1 |   | 7/2005  | Doherty et al. ............. 713/202        |
| 6,948,070 | B1 | * | 9/2005  | Ginter et al. ................ 713/193     |
| 6,993,131 | B1 |   | 1/2006  | Meyers ........................ 380/201    |
| 7,043,447 | B2 | * | 5/2006  | Hughes et al. ................. 705/26     |
| 7,165,041 | B1 |   | 1/2007  | Guheen et al. ................. 705/26     |
| 7,188,342 | B2 | * | 3/2007  | DeMello et al. ............. 717/173        |
| 7,231,669 | B2 | * | 6/2007  | Leung et al. .................. 726/26     |
| 7,249,107 | B2 | * | 7/2007  | Yaacovi ........................ 705/59    |
| 7,386,891 | B2 | * | 6/2008  | Peinado ........................ 726/26    |
| 7,389,919 | B2 | * | 6/2008  | Walker et al. ................ 235/383     |

(Continued)

FOREIGN PATENT DOCUMENTS

WO  WO 2006/031127 A2  3/2006

(Continued)

OTHER PUBLICATIONS

Fried, I., "Microsoft's Bach looks for Harmony in Entertainment", Jan. 11, 2007, http://news.com.com, 3 pages. Retrieved from IDS.*

(Continued)

*Primary Examiner*—James A Reagan
(74) *Attorney, Agent, or Firm*—Woodcock Washburn LLP

(57) ABSTRACT

An on-line service manages downloads of purchased digital content. Information regarding the digital content items that are purchased by each user and the terms of use of those purchased items is maintained. Information regarding the formats of digital content items that each device is adapted to receive is maintained. Upon determining that a user wishes to download a digital content item, the requested digital content is downloaded in an appropriate format for a particular digital device provided the recorded information indicates the content item has been purchased by the user and the download is within the quantity of downloads authorized by the terms of the purchase.

20 Claims, 7 Drawing Sheets

U.S. PATENT DOCUMENTS

| | | | |
|---|---|---|---|
| 7,412,061 B2 * | 8/2008 | Peinado et al. | 380/277 |
| 2002/0052850 A1 * | 5/2002 | Saito | 705/59 |
| 2003/0191954 A1 * | 10/2003 | Kambayashi et al. | 713/189 |
| 2004/0243815 A1 | 12/2004 | Tsukamura | 713/193 |
| 2004/0267590 A1 | 12/2004 | Clark et al. | 705/9 |
| 2005/0149340 A1 | 7/2005 | Murakami et al. | 705/1 |
| 2006/0053080 A1 | 3/2006 | Edmonson et al. | 705/59 |
| 2006/0080257 A1 | 4/2006 | Vaughan et al. | 705/51 |
| 2006/0200761 A1 * | 9/2006 | Judd et al. | 715/517 |
| 2007/0156603 A1 * | 7/2007 | Yoon et al. | 705/59 |
| 2007/0288387 A1 * | 12/2007 | Park et al. | 705/59 |
| 2008/0215491 A1 * | 9/2008 | Miller | 705/59 |
| 2008/0255994 A1 * | 10/2008 | Schnell et al. | 705/52 |

FOREIGN PATENT DOCUMENTS

| | | | |
|---|---|---|---|
| WO | WO 2006031127 A2 * | 3/2006 | |

OTHER PUBLICATIONS

Fried, I., "Microsoft's Bach looks for Harmony in Entertainment", Jan. 11, 2007, http://news.com.com, 3 pages.

Pearce, J. et al., "Device Description Landscape", W3C Working Draft, Feb. 10, 2006, http://www.w3.org/TR/dd-landscape, 10 pages.

Posted by Shawn Rider, "The Future of Xbox Live Arcade: Anywhere Means Mobile", http://www.gamesfirst.com, May 14, 2006, 5 pages.

* cited by examiner

BUY ONCE PLAY ANYWHERE

CROSS REFERENCE TO RELATED APPLICATIONS

This application is related by subject matter to U.S. patent application Ser. No. 11/731,041 titled "Managing Content Remotely On A Device" filed on even date herewith, the contents of which are hereby incorporated by reference in their entirety.

BACKGROUND

Information that traditionally has been distributed on physical media is now commonly distributed in electronic form via electronic networks. For example, information that has traditionally appeared in printed books, magazines, and newspapers, is now distributed electronically via the Internet and World Wide Web ("Web"). Home video games, which traditionally have been distributed using physical cartridges, compact disks (CDs), and/or digital video disks (DVDs), are now distributed electronically by services such as, for example, MICROSOFT® XBOXLive (www.xbox.com), that are accessible via the Internet. Similarly, music recordings, which traditionally have been distributed using CDs and other physical media, are now distributed electronically via Internet accessible services such as, for example, MICROSOFT® Zune Marketplace (www.zune.net). Indeed, entertainment content of all types—motion pictures, video games, photographs, music recordings, novels, articles, etc.—which traditionally have been distributed on physical media are distributed electronically via on-line services.

Existing on-line services typically download digital content to the electronic device from which the request for digital content was made. For example, when a gaming console user requests to download digital content from an on-line service, the requested digital content, which may be a game, video, music, etc., is downloaded to the gaming console from which the request was made. Similarly, when a media player user requests to download digital content, the data is downloaded to the media player associated with the request.

Different digital devices often embody different hardware and software for playing digital media content. For example, a portable media player may have a different codec, i.e., hardware/software for encoding and decoding digital data, for playing music and video than a gaming console. Similarly, two media players made by different manufacturers may have different hardware and software for playing digital content.

The hardware and/or software used in a device for displaying or playing digital content may require that the digital content that is to be used on the device be in a particular format. For example, a portable media player that has one codec may be adapted to play video recordings in a first format, e.g., MPEG-1, while a gaming console with a different codec may be adapted to play video recordings in another format, e.g. MPEG-2. Due to the variation in the hardware and software that exists on different devices, users of existing services typically specify the download format when requesting digital content.

Conventionally, on-line services for downloading digital content are for-fee services, i.e., users are required to pay for the content that they download. When a user downloads a digital content item to a particular device, he or she pays for that download. If a user downloads the content a second time to a different device, the user typically pays a second time.

SUMMARY

In the subject matter described herein, an illustrative on-line service manages downloads of purchased digital content. The service maintains a database of information relating to users that are authorized to download digital content items. The information in the database, for example, may comprise records of the digital content items that the user has purchased and for each purchased digital content item any terms relating to the purchase that limit the quantity of downloads that the user may make. Also, the service maintains a database of information relating to particular devices to which users may download digital content items. The device database may comprise, for example, the media formats that each of the devices is adapted to read.

When the illustrative service determines that a user wishes to download a digital content item to a particular digital device, it queries the device database to identify a digital content format that the identified digital device is adapted to receive. The service queries the user database to determine whether or not the user has purchased the requested digital content item and, if so, whether the terms relating to the purchase allow for the requested download. If the service determines that the requesting user has, in fact, purchased the requested digital content and the download is consistent with the purchase terms, the requested digital content is downloaded in the appropriate format for the identified digital device.

If the illustrative service determines that the user wishes to download the same digital content item to second digital device, the service queries the device database to identify a digital content format that the second digital device is adapted to receive. The service queries the user database to determine whether the terms relating to the purchase allow for the additional requested download. If the service determines that the additional download is consistent with the license terms, the requested digital content is downloaded in the appropriate format for the second digital device.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

Figure 1:
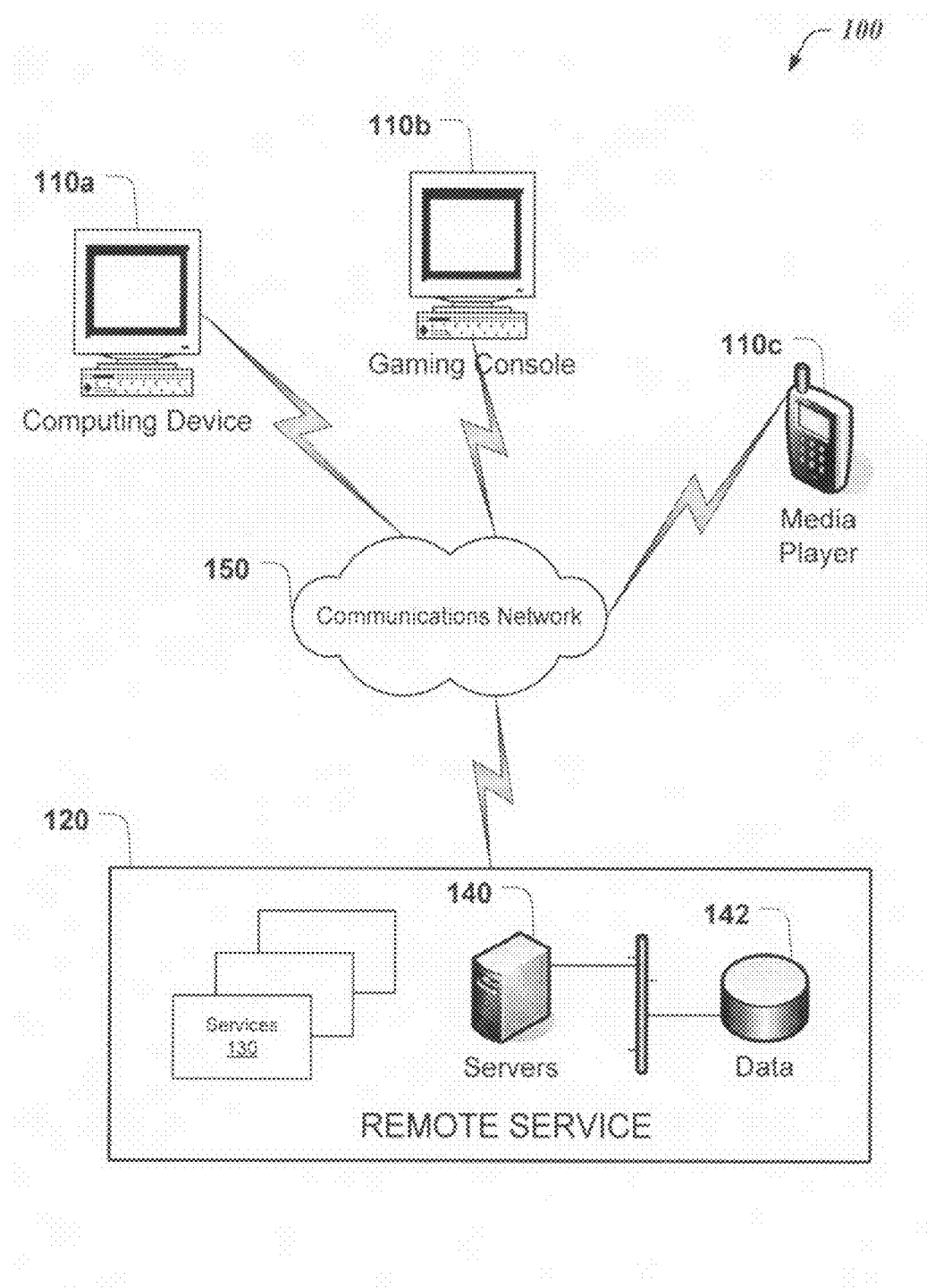
FIG. 1 is a block diagram of an illustrative computing arrangement in which aspects of the subject matter described herein may be implemented.

Typically, different types of digital devices have different hardware and software embodied therein for playing digital media content. For example, a portable media player may have a different video codec than a gaming console. The differences in hardware and software generally results in the format of the digital content played on devices being different as well. For example, a portable media player that has one codec may be adapted to play video recordings that are stored in a first format, e.g., MPEG-1, while a gaming console with a different codec may be adapted to play video recordings in another format, e.g., MPEG-2. In connection with existing services for downloading digital content, due to the variation in the hardware and software that exists between devices, typically the user that requests a download must also specify the download format.

It can be frustrating for users who may have purchased a content item and downloaded the content to one device, that they cannot play that downloaded content on another device that is not adapted to read the format of the digital content item as initially downloaded. For example, a user may purchase a music recording and have it downloaded to a gaming console in a format readable by the gaming console. At some later time, the user may wish to play that same music recording on a portable media player. It may not be useful to copy the downloaded music recording from the gaming console to the portable media player because the hardware and software of the two devices, and in particular the codecs, that are used to play the digital content item may not be compatible. In other words, the digital content item downloaded to the gaming console may not play on the portable media device.

With existing on-line services for downloading digital content, a user's only alternative, even though he or she previously downloaded the digital content item, is to download the digital content item a second time to the second device. Typically, most existing services are for-fee services. Therefore, even though the user may have previously purchased the digital content item, he or she may need to pay a second time to have the digital content item downloaded to the second device.

The subject matter described herein is directed to a service that allows a user to purchase a digital content item a single time and thereafter download that content to a plurality of devices on request. The service identifies the format of the requested digital content item that is appropriate for each device that a user may request to have the content downloaded to.

In connection with an illustrative service, when the service determines that a user wishes, desires, or is interested in downloading a digital content item to a particular digital device, the service queries a device database to identify a digital content format that the identified digital device is adapted to receive. The service queries a user database to determine whether or not the requesting user has purchased the requested digital content item and, if so, whether the user is within the number of authorized downloads. If the service determines that the requesting user has, in fact, purchased the requested digital content and is within the limit of authorized downloads, the requested digital content is downloaded in the appropriate format for the identified digital device.

If service determines that the user wishes to download the same digital content item to a second digital device, the service queries the device database to identify a digital content format that the second digital device is adapted to receive. The service queries the user database to determine whether downloading the content to the second device will exceed the number authorized downloads. If the service determines that the additional download is consistent with the license/purchase terms, the requested digital content is downloaded in the appropriate format for the second digital device. If the service determines that the additional download is not consistent with the terms of the purchase, the service prompts the user to purchase additional rights prior to performing the download.

Example Computing Arrangement

FIG. 1 illustrates an exemplary computing network 100 suitable for purchasing digital content and accessing that content from a plurality of devices. Remote service 120 provides access to functionality of interest to users, including the capability to purchase digital content and download that digital content on a plurality of devices. Users interface with computing devices 110*a-c* to access remote service 120 via communications network 150.

In an exemplary environment, remote service 120 provides access to functional services that are of interest to users including a service 130 to provide distributed access to purchased content as described herein. Additional functional services that may be of interest to users and available through remote service 120 include, for example, browsing for digital content items available for download, voice/chat, friends lists, matchmaking, roaming, feedback, tournaments, voice messaging, content updates, etc. The functional services are operated on computing servers 140 and communicate with data stores 142 which accessed locally or remotely. Any number of servers 140 and data stores 142 may be used to provide a functional service such as that for distributed access to purchased content 130 described herein.

Remote service 120 is accessible via communications network 150. Communications network 150 may be any type of network that is suitable for providing communications between computing devices 110*a-c* and remote service 120. Communications network 150 may comprise a combination of discrete networks which may use different technologies. For example, communications network 150 may comprise local area networks (LANs), wide area networks (WAN's), or combinations thereof. Communications network 150 may comprise wireless, wireline, or combination thereof. In an exemplary embodiment, communications network 150 comprises the Internet and may additionally comprise any networks adapted to communicate with the Internet.

Persons that wish to access remote service 120 and, in particular service 130 for distributed access to purchased content, may do so using computing devices 110*a-c*. Computing devices 110*a-c* may be any type of device that is operable to communicate with remote service 120. For example, computing devices 110*a-c* may be personal computers, game consoles, hand-held computing devices, media players, wireless phones, personal digital assistants, etc. While only three devices are illustrated in FIG. 1, it is understood that remote service 120 and functional services 130 may be accessed via any number of computing devices 110*a-c*.

Computing arrangement 100 may employ a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computing device, such as one of devices 110a-c, that accesses shared network resources provided by another computer (i.e., a server). A server, such as device 140, is typically a remote computer system accessible over a remote network such as the Internet. The client process may be active in a first computer system 110a-c, and the server process may be active in a second computer system 140, communicating with one another over a communications medium 150 and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

Figure 2:
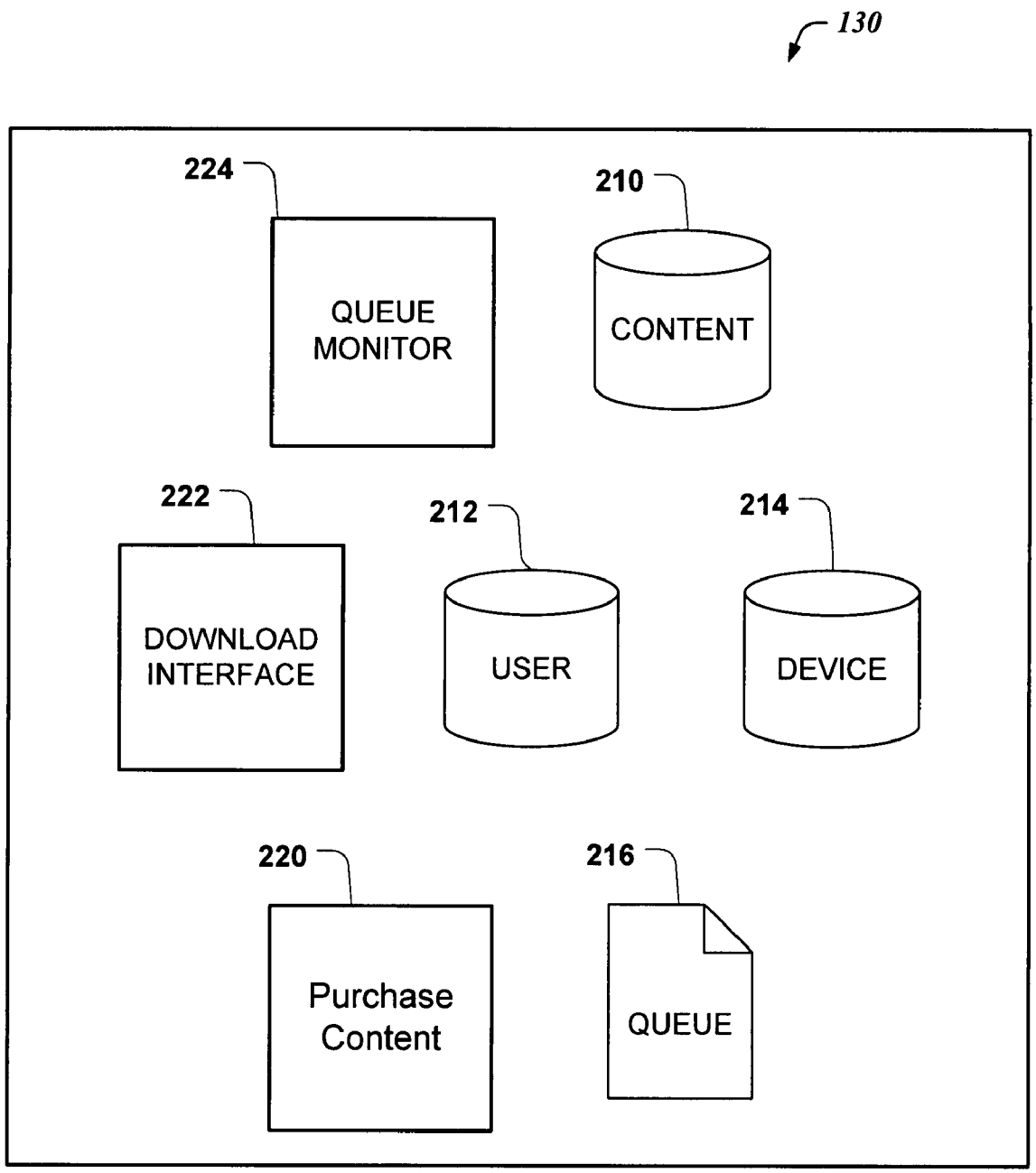
FIG. 2 is a block diagram depicting logical components of an illustrative service for managing distribution of digital content.

FIG. 2 depicts a block diagram of exemplary logical components of an illustrative service 130 for managing the downloading of purchased content. Illustrative service 130 comprises or has access to digital content store or database 210 that comprises digital content items that are available for download. Content store 210 may comprise any type of digital content that users may wish to retrieve electronically. This may include, for example, video games, recorded music, video, photographs, pictures, recorded sounds, novels, articles, etc. In an illustrative embodiment, content store 210 may also comprise placeholders for digital content that is anticipated, but which is not yet available. For example, a movie or a video game that is expected or scheduled to be released in the future may have a placeholder in digital content store 210. Users may request that the anticipated content item be downloaded when released and received into the system.

Content store 210 may comprise an index of the various content items located therein for purposes of retrieving particular digital content items. Content store 210 may be indexed, for example, using database software so as to be readily accessible. The database may make use of any suitable technology such as relational and object databases and may employ any of the commercially available database software such as MICROSOFT® SQL.

Functional service 130 for managing downloading of purchased content comprises user database 212. User database 212 comprises information about users that are authorized to purchase and download digital content via service 130. User information that is stored in database 212 may include, for example: the person's name; address; billing information such as credit card information; and the digital devices to which the user may download digital content. User database 212 may further comprise a record of the digital content items that the user has purchased. Moreover, for each of the content items that the particular user has purchased, user database 212 comprises purchase or license terms associated with the content including, for example, any limitations on the quantity of devices to which the user may download the purchased content. For example, if as a term of the purchase the user is authorized to download the purchased content to only one device, information to that effect is stored in database 212. Alternatively, if the user is authorized to distribute the purchased content to any number of devices, this information is reflected in database 212 as well.

Device database 214 comprises information about devices that are registered with the service and to which data may be downloaded. For example, database 212 may comprise for each device: a unique identifier; the type(s) of content readable by the device; the suitable/useable and/or optimal format for content readable by the device; a communication path with the device; a storage location on the device at which data should be stored; preferred times for downloading data to the device; users that may use the device; etc. Databases 212 and 214 may make use of any suitable technology such as relational and object databases and may employ any of the commercially available database software such as, for example, MICROSOFT® SQL.

Queue 216 comprises a record of the requests to download digital content that have been made to service 130. For example, queue 216 may comprise for each download request: a unique identifier for the request; the content item requested for downloaded; the person that made the request; the device from which the request was made; the parameters associated with the request; and the status of the request. Parameters associated with the request comprise information that defines conditions and/or characteristics for downloading data. For example, the parameters for a request may define when the requested content item is to be downloaded—whether it be on a particular day, a particular time of day, during a particular window of time, when certain conditions exist on the target device, and/or when certain conditions exist in the network, e.g., available bandwidth. The request parameters may also specify, for example, a particular device(s) to which the requested content item is to be downloaded. For example, the request parameters may define that the content item is to be downloaded to a particular portable media player, game console, digital phone, and/or computer. In an example embodiment, queue 216 may comprise entries for digital content that is scheduled or expected to be released in the future. Parameters associated with such download requests may define that the content is to be downloaded upon receipt of the digital content item.

Queue 216 may be stored in any format that is suitable for tracking request information. Queue 216 may be stored in, for example, a relational database, in a data structure stored in random access memory, a combination of the two, or any other suitable format. It is understood that the requests recorded in queue 216 may be accessed and processed without regard to when the request was received and placed in queue 216. Queue 216 may be centrally managed and maintained.

Purchase content server 220 provides a server interface for users operating devices 110a-c to purchase digital content items. Purchase content server 220 allows users to select particular content items that they wish to purchase and specify the purchase/license terms under which they plan to use the content. For example, a purchase/license term may entitle the user to play the purchased content on any of his/her registered devices. Another example term may limit the user to playing the purchased content on a single device. Arrangements may, for example, run the gamut from allowing the user to play the content on one device to allowing the user to play the content on all of the users registered devices. The price of purchasing the content item may vary depending upon the arrangement selected by the user. Purchase content server 220 records the user's purchase and the terms of the purchase/license in user database 212.

Download interface server 222 operates as an interface for users to input requests to download content items and to modify existing download requests. For example, download interface server 222 allows for the user to specify the devices the user may wish to download the digital content to. A user may specify that the digital content item is to be downloaded to all devices registered for the user. The user may further specify any conditions on when/how the digital content item is to be downloaded. For example, the user may specify that the content item is to be downloaded immediately, upon identifying that the particular device has established communication with the service, upon identifying that a client has requested the digital content item, and/or upon satisfaction of a business rule. Server 222 updates queue 216 in response to user inputs and may access user database 212 and device database 214 as needed. For example, upon receiving a new request to download a digital content item, download interface server 222 updates queue 216 to reflect the new request including all related information such as any user-defined parameters. Similarly, server 222 receives user inputs to modify previously entered requests for downloads and updates queue 216 accordingly. For example, if a user should request to modify the originally requested time for a download, server 222 updates queue 216 to reflect the new time.

Users at computing devices 110*a-c* may access purchase content server 220 and download interface server 222 in any number of ways. Servers 220 and 222 may comprise or be served by a World Wide Web server and be accessible to users of devices 110*a-c* loaded with Web browsing software and with access to the Web. Download interface server 222 may also be accessible via an application programming interface ("API"). Users of computing devices 110*a-c* may invoke software applications which make use of the API to communicate requests to download interface server 222. Purchase content server 220 and download interface server 222 may be integrated. Further, the purchase of content items and defining the parameters for downloading content items may be seamless.

Queue monitor server 224 monitors queue 216 to identify digital content items that are prepared for download as specified by the user-defined parameters. In other words, queue monitor server 224 is programmed to respond to any conditions that have been placed on a particular request for digital content. For example, a request in queue 216 may have been defined to take place at a particular time or period of time. Queue monitor server 224 identifies when the defined time arrives and downloads the requested content item from content database 210 consistent with the download parameters that were defined by the user and stored in queue 216. Similarly, if the request parameters specify that that the download was to take place the next time that a particular device initiates communication with the service, queue monitor server 224 will initiate the download upon the specified device communicating with the service. If the request parameters specify that the download is to take place upon the scheduled release of the requested content item, queue monitor server 224 will coordinate the download upon receipt of the requested content item.

Managing Downloads of Purchased Content

Figure 3:
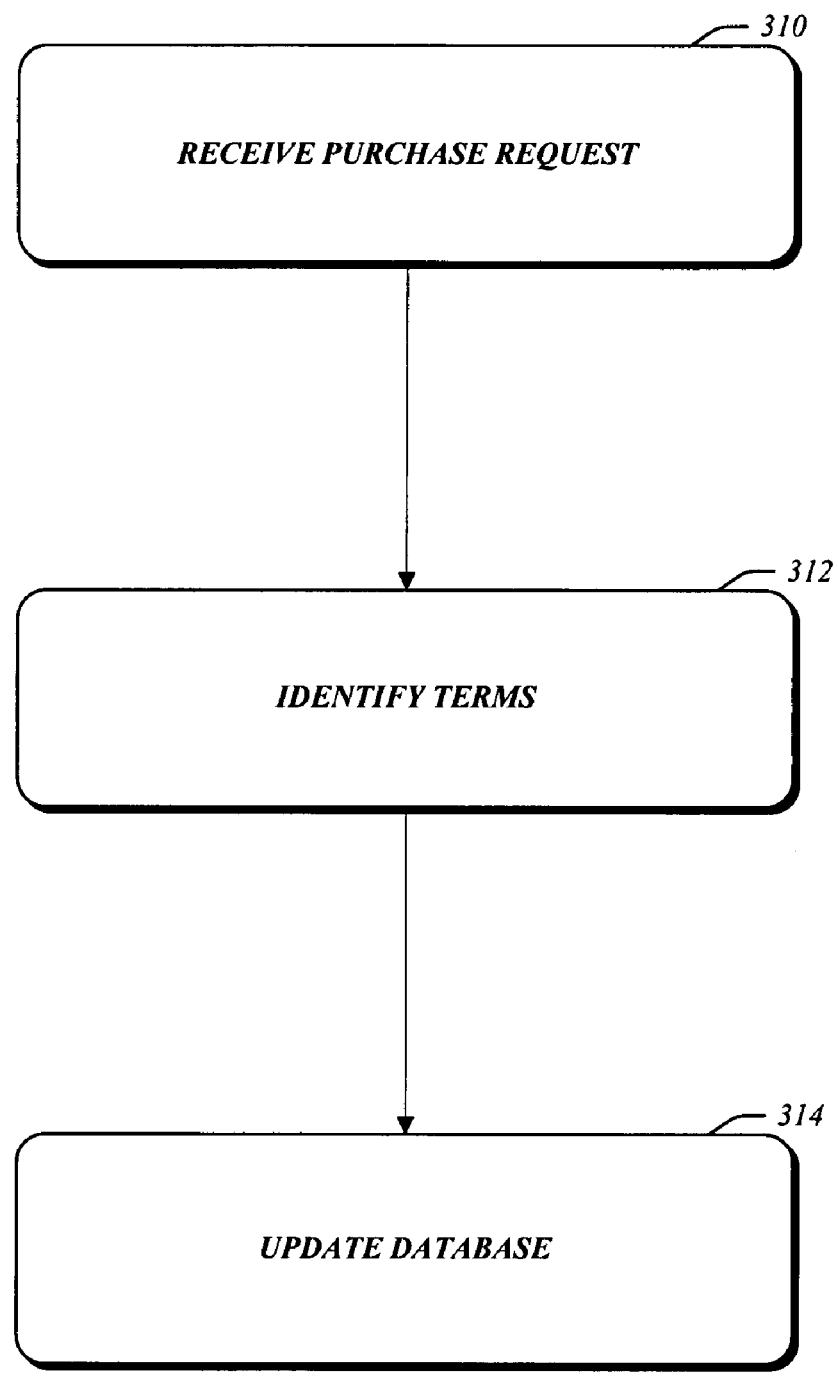
FIG. 3 is a flow diagram of a process for handling requests to purchase digital content items.

FIG. 3 is a flowchart of a process for receiving requests to purchase digital content items. At step 310, purchase content server 220 receives a request to purchase a particular content item. The user may have used another service accessible at remote service 120 to browse and select the particular content item. The requested digital content item may be identified, for example, by a unique identifier that corresponds to a digital content item in content store 210.

At step 312, purchase content server 220 interfaces with the user to identify the purchase or license terms and limitations for the requested particular digital content item. For example, a purchase arrangement or term may specify the quantity of devices that a user may download the purchased content item to. A user may be entitled to play the purchased content on an unlimited number of devices, any of his/her registered devices, a single device, or any scenarios in between.

At step 314, purchase content server 220 updates user database 212 with information regarding the purchased digital content. More specifically, user database 212 is updated to reflect the particular digital content item that the user has purchased and the terms and limitations associated with the purchase.

In an illustrative embodiment, the process of purchasing a digital content described in connection with FIG. 3 is performed prior to the user actually downloading the digital content item. In some scenarios, the user may immediately choose to download the digital content item that was purchased. In other circumstances, the user may choose to download the content at a time removed from the purchase.

Figure 4:
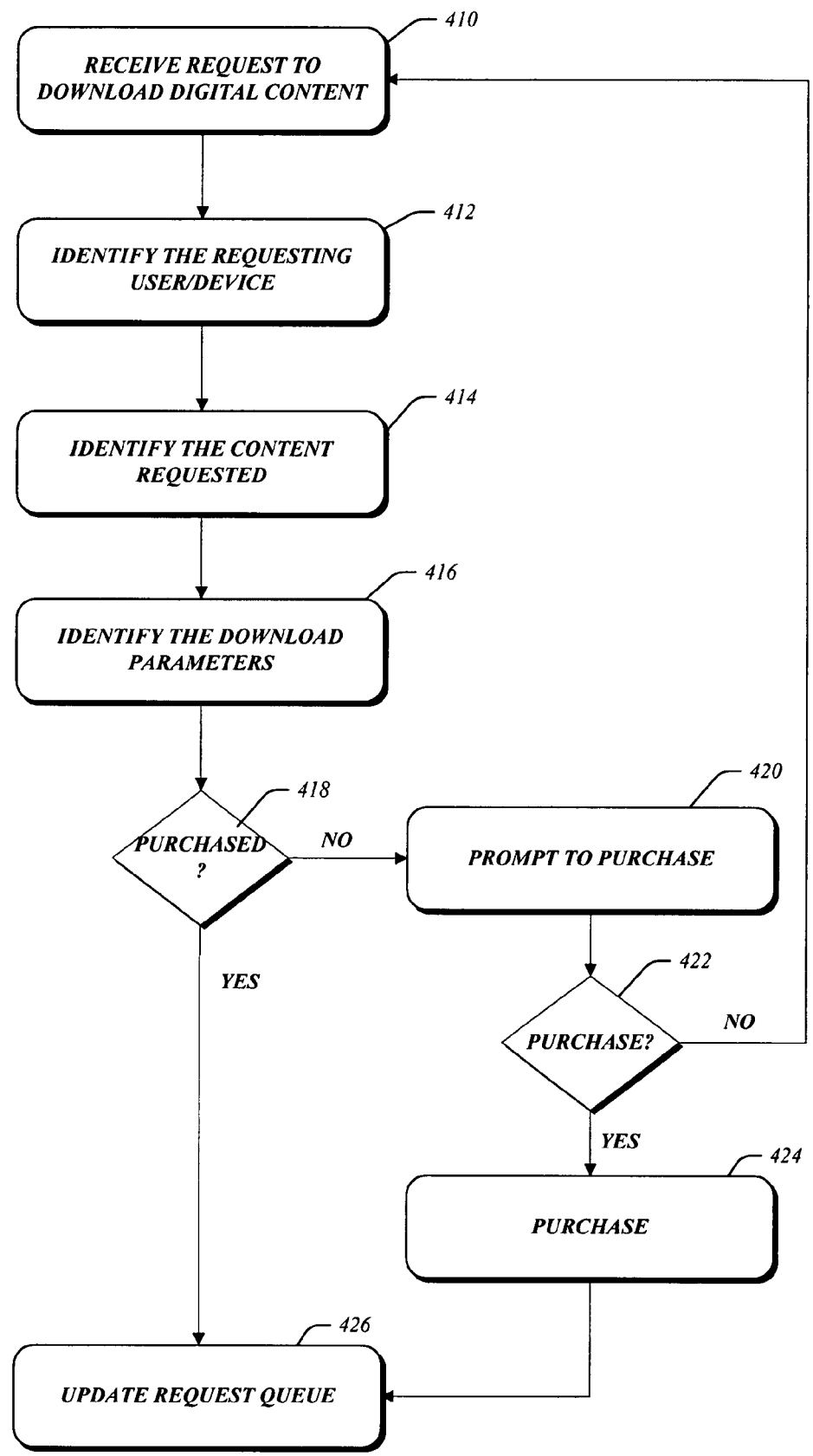
FIG. 4 is a flow diagram of a process for receiving requests to download digital content items.

FIG. 4 is a flowchart of a process for handling information specifying download parameters for downloading digital content. At step 410, download interface server 222 receives information specifying a user's wishes/interests for downloading a digital content item. The request may comprise information about the request and the source of the request. For example, the information may comprise an identification of the user making the request, an identification of the content item requested for download, an identification of the device(s) to which the content item is to be downloaded, any conditions or triggers specifying how and when the digital content item is to be downloaded, and any other parameters relating to the download. At step 412, download interface server 222 parses the request and/or interfaces with the requestor to identify the user that initiated the request and the device from which the request was made. In an illustrative embodiment, the requesting user and device are registered with the service and have associated unique identifiers which may be stored in databases 212 and 214. Server 222 may reference databases 212 and 214 in connection with parsing the request to identify the user and device.

At step 414, download interface server 222 parses the request and/or interfaces with the user to identify the content item requested. The content item may be identified, for example, by a unique identifier that refers to a specific content item in content database 210. The user may have previously identified and selected a particular content item using a functional service that provides users the ability to browse items in content database 210.

At step 416, download interface server 222 parses the request and/or interfaces with the user to identify any download parameters that are associated with the request. The parameters may specify any conditions, requirements, and/or characteristics of the download that is to take place. The request parameters specify the device to which the content item is to be downloaded. For example, the request parameters specify that the content item is to be downloaded to a particular media player, game console, digital phone, and/or computer. The parameters for a request may define when the requested content item is to be downloaded—whether it be on a particular day, a particular time of day, during a particular window of time, when certain conditions exist on the target device, when the target device initiates communication with the service, and/or when certain conditions exist in the network.

At step 418, download interface server 222 determines whether the particular user has purchased and is authorized under the terms of the purchase to make the requested download to the requested device. Download interface server 222 may query user database 212 to determine whether, in fact, the user has purchased the requested digital content item, and if so, whether the terms associated with that particular purchase allow for the download to the target device. For example, if the information in user database 212 indicates that the user purchased the requested content item and the terms of the purchase allow for downloading to all of the user's devices, the download will be allowed to proceed to step 426.

If, however, at step 418, the information in database does not indicate the user has purchased the content item or the existing terms do not allow for downloading to the target device, at step 420 the download interface server 222 may prompt the user to purchase the content and/or obtain the appropriate terms for downloading to the target device.

At step 422, the user may or may not select to make the required purchase. If not, download interface server 222 will continue processing other requests for downloads at step 410. However, if the user elects to make the purchase, download interface server 222 allows the user to do so at step 424. Similar to what is described above in connection with FIG. 3, the information regarding the purchase is stored in user database 212.

At step 426, download interface server 318 updates request queue 216 with the download request. Download interface server 318 may assign a new unique identifier to the request and store it with the information relating to the request in queue 216. The information stored in relation to the request may include, for example, information identifying the requested content item, the user that made the request, the device to which the content is to be downloaded, and any other parameters specifying conditions or characteristics for downloading the data.

Figure 5:
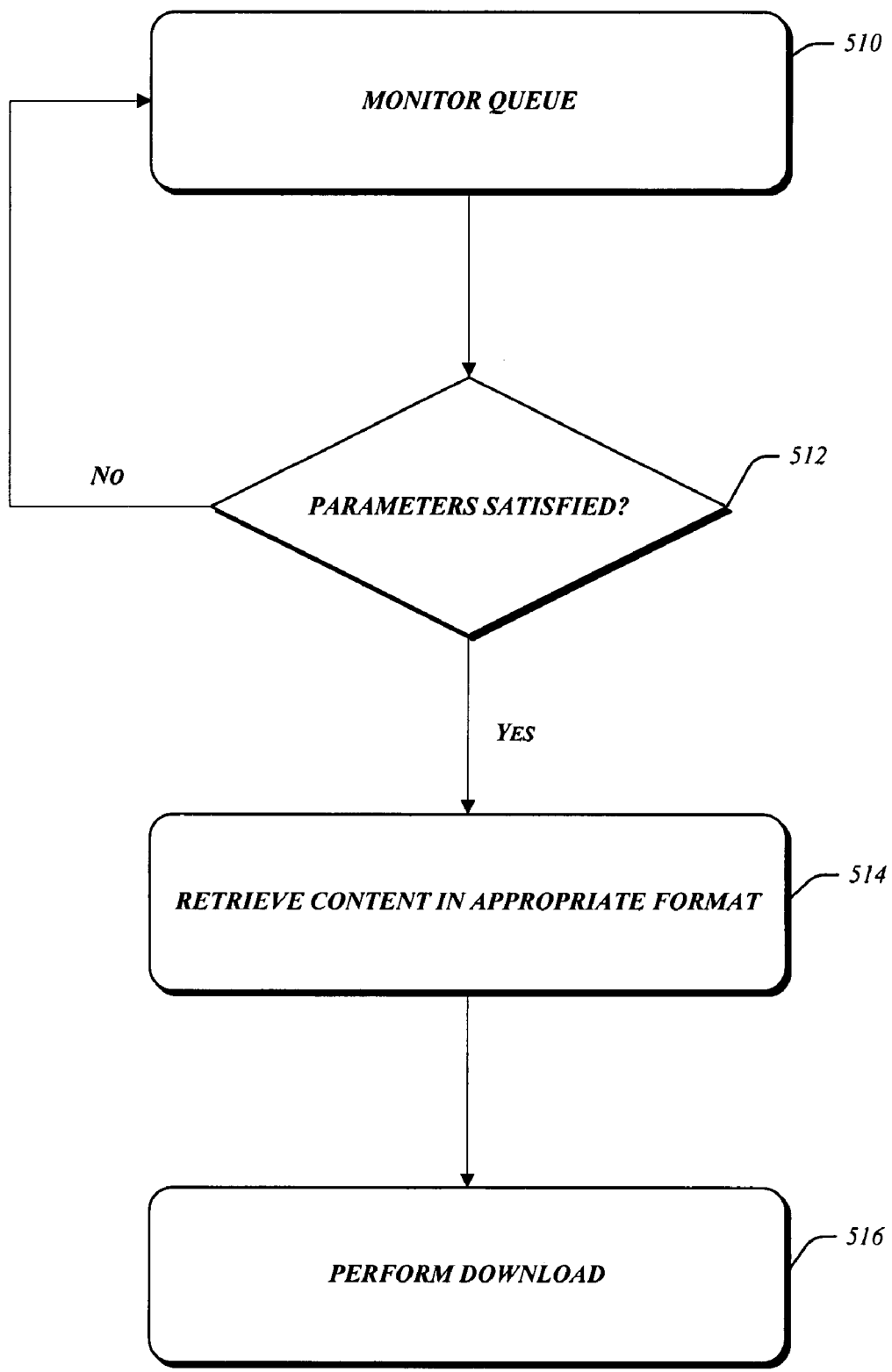
FIG. 5 is a flow diagram of a process for monitoring a queue of requests for downloading digital content.

Once the request has been received and entered into queue 216, queue monitor 224 operates to initiate the download of requested digital content items consistent with the parameters comprised in the request. FIG. 5 is a flow diagram of a process for downloading digital content. At step 510, queue monitor 224 continuously monitors the requests in queue 216. At step 512, queue monitor 224 determines whether the download parameters associated with each request in queue 214 have been satisfied, indicating that the digital content item is to be downloaded consistent with the user's wishes. For example, queue monitor 224 may determine whether or not the time or period of time that is specified by the parameters associated with a requested download has been satisfied. In another example, queue monitor 224 may determine whether or not the target communications device is available to receive the digital content item, e.g., the target devices is in communication with the service. In another example, queue monitor 224 may determine that a particular business rule or condition has been satisfied.

If the parameters are not satisfied, queue monitor 224 continues to check the parameters of the requests in queue 214. If at step 512, the parameters defined for the requested download are satisfied, at step 514, queue monitor 224 retrieves the desired content item in the format suitable for the target device. This step may require queue monitor 224 to query device database 214 for the format suitable for the target device. This step accounts for differences between devices as to the hardware and software that is used to play a content item. For example, the format of a music recording that is to be played on a portable media player may be different from the format of a music recording that is to be played on a gaming console. Using information in device database 214, queue monitor 224 can identify the appropriate format for the digital content to be useable by the target device. The information in device database 214 and retrieved by monitor 224 may identify a format that is optimized for the particular target device.

At step 516, the requested content item in a format appropriate for the target device is downloaded. The download is performed consistent with the parameters defined for the request. For example, if the parameters defined that the content item is to be stored at a particular location in memory on the target device, the download will be performed as such.

Example Computing Environments

Figure 6:
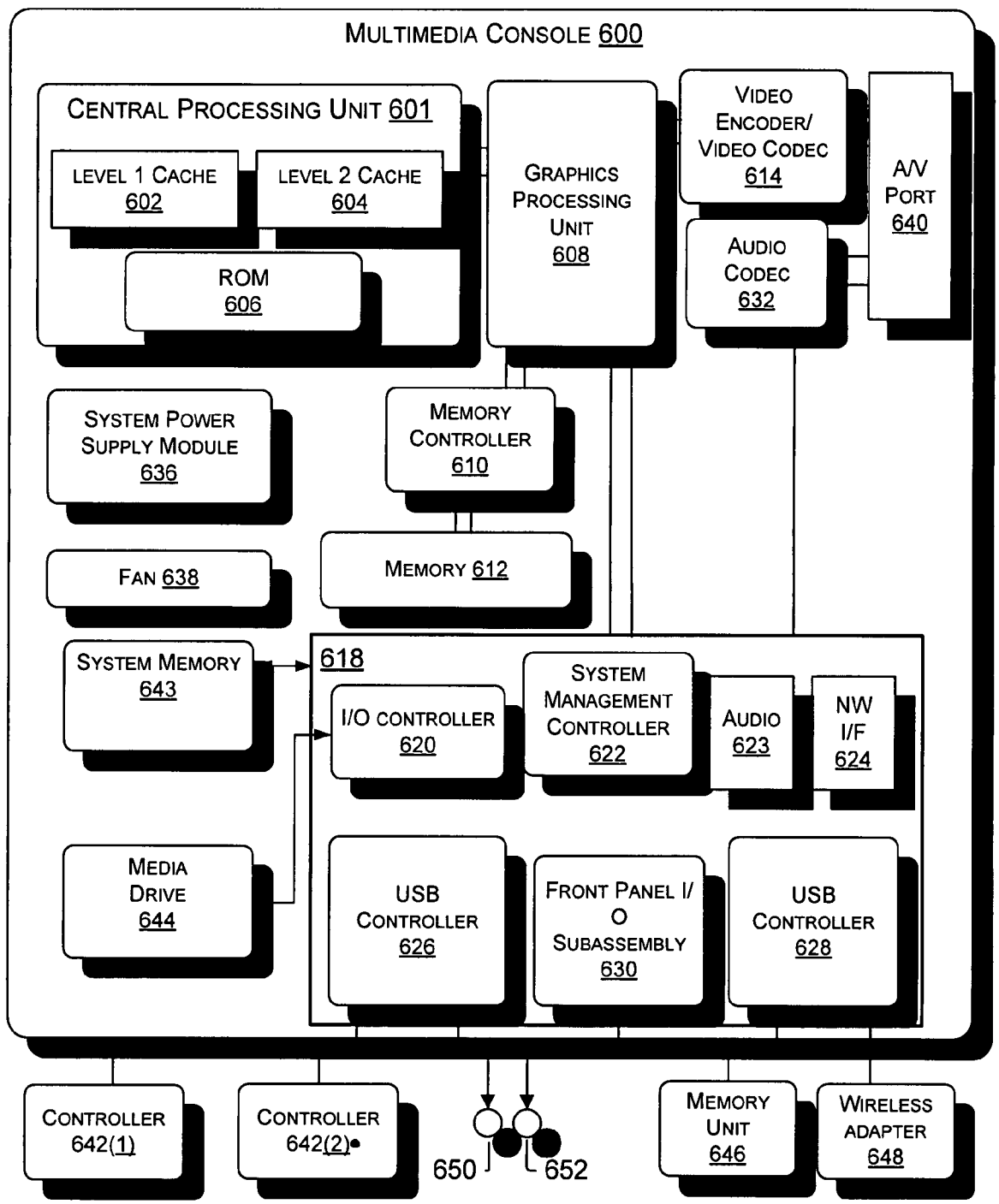
FIG. 6 is a block diagram of an illustrative console that may be suitable for incorporation into a network computing environment in which aspects of the subject matter described herein may be deployed.
Figure 7:
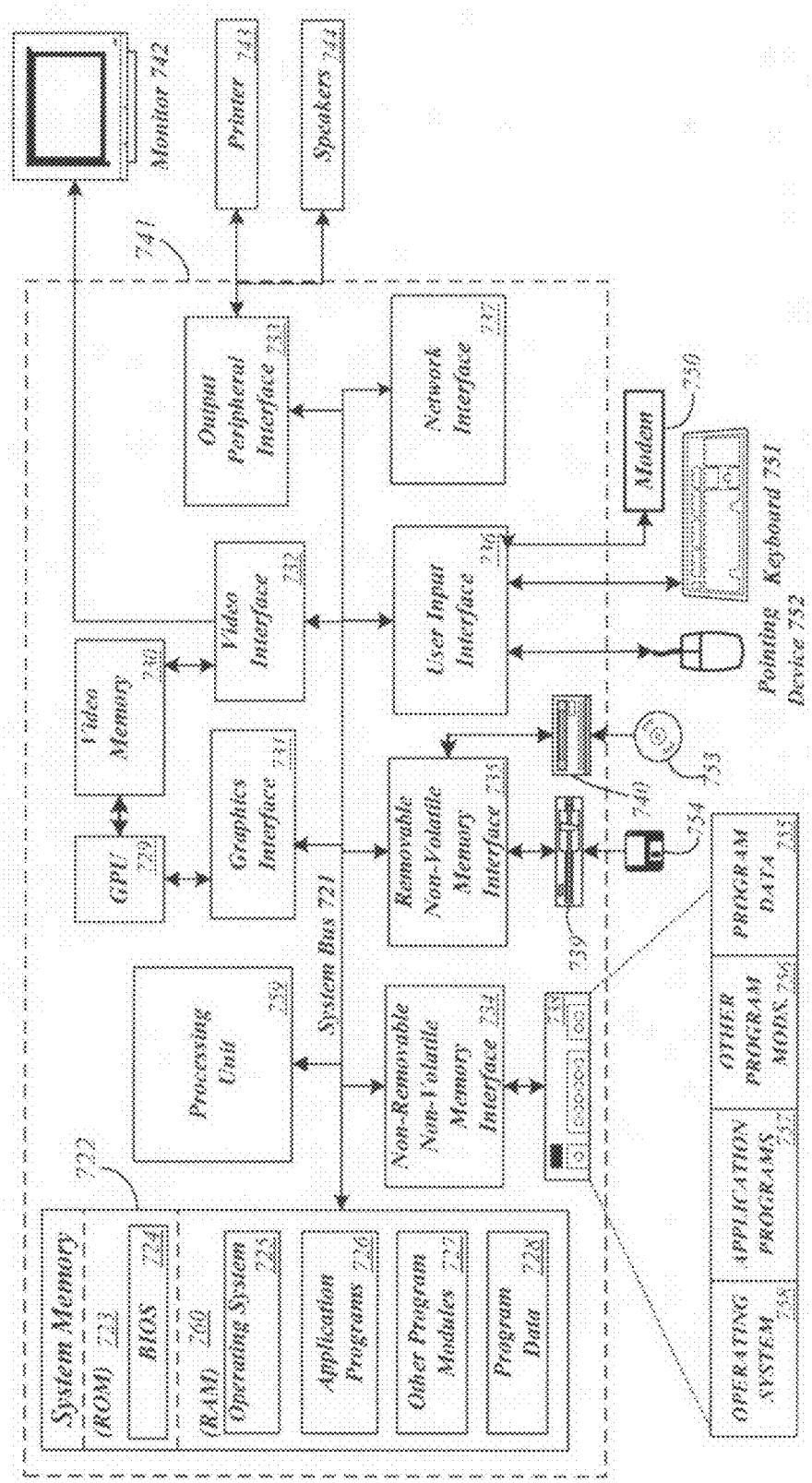
FIG. 7 is a block diagram of a computing environment in which aspects of the subject matter described herein may be deployed.

FIGS. 6 and 7 provide example computing systems that may be used in an exemplary computing arrangement to provide service 130 for managing downloads of purchased content, as well as provide access to such a service.

FIG. 6 is a block diagram of an example game console 600 that may be used to access an illustrative service 130 for managing downloads of purchased digital content as described above. Example game console 600 has a central processing unit (CPU) 601 having a level 1 (L1) cache 602, a level 2 (L2) cache 604, and a flash ROM (Read-only Memory) 606. The level 1 cache 602 and level 2 cache 604 temporarily store data and hence reduce the number of memory access cycles, thereby improving processing speed and throughput. The flash ROM 606 can store executable code that is loaded during an initial phase of a boot process when the game console 600 is initially powered. Alternatively, the executable code that is loaded during the initial boot phase can be stored in a FLASH memory device (not shown). Further, ROM 606 can be located separate from CPU 601. Game console 600 can, optionally, be a multi-processor system; for example game console 600 can have three processors 601, 603, and 605, where processors 603 and 605 have similar or identical components to processor 601.

A graphics processing unit (GPU) 608 and a video encoder/video codec (coder/decoder) 614 form a video processing pipeline for high speed and high resolution graphics processing. Data is carried from the graphics processing unit 608 to the video encoder/video codec 614 via a bus. The video processing pipeline outputs data to an ANV (audio/video) port 640 for transmission to a television or other display device. A memory controller 610 is connected to the GPU 608 and CPU 601 to facilitate processor access to various types of memory 612, such as, but not limited to, a RAM (Random Access Memory).

Game console 600 includes an I/O controller 620, a system management controller 622, an audio processing unit 623, a network interface controller 624, a first USB host controller 626, a second USB controller 628 and a front panel I/O subassembly 630 that may be implemented on a module 618. The USB controllers 626 and 628 serve as hosts for peripheral controllers 642(1)-642(2), a wireless adapter 648, and an external memory unit 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless interface components including an Ethernet card, a modem, a Bluetooth module, a cable modem, and the like.

System memory 643 is provided to store application data that is loaded during the boot process. A media drive 644 is provided and may comprise a DVD/CD drive, hard drive, or other removable media drive, etc. The media drive 644 may be internal or external to the game console 600. When media drive 644 is a drive or reader for removable media (such as removable optical disks, or flash cartridges), then media drive 644 is an example of an interface onto which (or into which) media are mountable for reading. Application data may be accessed via the media drive 644 for execution, playback, etc. by game console 600. Media drive 644 is connected to the I/O controller 620 via a bus, such as a Serial ATA bus or other high speed connection (e.g., IEEE 3394). While media drive 644 may generally refer to various storage embodiments (e.g., hard disk, removable optical disk drive, etc.), game console 600 may specifically include a hard disk 652, which can be used to store game data, application data, or other types of data.

The system management controller 622 provides a variety of service functions related to assuring availability of the game console 600. The audio processing unit 623 and an audio codec 632 form a corresponding audio processing pipeline with high fidelity, 3D, surround, and stereo audio processing according to aspects of the present subject matter described herein. Audio data is carried between the audio processing unit 623 and the audio codec 626 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the game console 600. A system power supply module 636 provides power to the components of the game console 600. A fan 638 cools the circuitry within the game console 600.

The CPU 601, GPU 608, memory controller 610, and various other components within the game console 600 are interconnected via one or more buses, including serial and parallel buses, a memory bus, a peripheral bus, and a processor or local bus using any of a variety of bus architectures.

When the game console 600 is powered on or rebooted, application data can be loaded from the system memory 643 into memory 612 and/or caches 602, 604 and executed on the CPU 601. The application can present a graphical user interface that provides a consistent user experience when navigating to different media types available on the game console 600. In operation, applications and/or other media contained within the media drive 644 may be launched or played from the media drive 644 to provide additional functionalities to the game console 600.

The game console 600 may be operated as a standalone system by simply connecting the system to a television or other display. In this standalone mode, the game console 600 may allow one or more users to interact with the system, watch movies, listen to music, and the like. However, with the integration of broadband connectivity made available through the network interface 624 or the wireless adapter 648, the game console 600 may further be operated as a participant in a larger network community.

FIG. 7 is a block diagram representing an example computing environment 700. Example computing environment 700 may be used in a number of ways to implement the disclosed service 130 for managing downloads of purchased content. For example, computing environment 700 may operate as a computer server to implement any of the servers described above in connection with service 130. Computing environment 700 may operate as a user computing device 110a-c for accessing functional service over communications network 150.

Computing environment 700 is only one example of a suitable computing environment and is not intended to suggest any limitation as to the scope of use or functionality of the subject matter disclosed herein. Neither should the computing environment 700 be interpreted as having any dependency or requirement relating to any one or combination of components illustrated in the example operating environment 700.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, portable media devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 741. Components of computer 741 may include, but are not limited to, a processing unit 759, a system memory 722, and a system bus 721 that couples various system components including the system memory to the processing unit 759. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media can be any available media that can be accessed by computer 741 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 741. Communication media typically embodies computer readable instructions, data structures, program modules or other data in a modulated data signal such as a carrier wave or other transport mechanism and includes any information delivery media. The term "modulated data signal" includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 722 includes computer storage media in the form of volatile and/or nonvolatile memory such as read only memory (ROM) 723 and random access memory (RAM) 760. A basic input/output system 424 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 7 illustrates operating system 725, application programs 726, other program modules 727, and program data 728.

Computer 741 may also include other removable/non-removable, volatile/nonvolatile computer storage media. By way of example only, FIG. 7 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7, provide storage of computer readable instructions, data structures, program modules and other data for the computer 741. In FIG. 7, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

Thus, an illustrative service for managing downloads of purchased digital content has been disclosed. An illustrative service allows a user to purchase a digital content item a single time and thereafter download that content to a plurality of devices on request. The service identifies the format of the requested digital content item that is appropriate for each device that a user may request to have the content downloaded to.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium.

In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of managing downloads of digital content implemented by a computing system, comprising:

receiving a request from a user to purchase a digital content item;

determining the digital content item is to be downloaded to a first device, the first device identified in a database of information as one of a plurality of devices associated with the user and to which the user may download data;

in response to determining the digital content item is to be downloaded to a first device, querying the database of information, the database comprising for each of a plurality of devices: a unique identifier; a type of readable content; an optimal format for readable content; and a storage at which content items should be stored;

identifying from the database a first download format for the first device, the first download format associated in the database with a unique identifier associated with the first device and specifying an optimal format for readable content on the first device;

identifying from the database a first storage location in computing memory on the first device at which the digital content item is to be stored upon download, the first storage location associated in the database with a unique identifier associated with the first device; and downloading the digital content item in the first download format to the first storage location on the first device;

determining the digital content item is to be downloaded to a second device, the second device identified in the database of information as one of a plurality of devices associated with the user and to which the user may download data; and in response to determining the digital content item is to be downloaded to a second device, querying the database of information;

identifying from the database a second download format for the second device, the second download format associated in the database with a unique identifier associated with the second device and specifying an optimal format for readable content on the second device;

identifying from the database a second storage location in computing memory on the second device at which the digital content item is to be stored upon download, the second storage location associated in the database with a unique identifier associated with the second device; and downloading the digital content item in the second download format to the second storage location on the second device.

2. The method of claim 1, wherein identifying for the first device a first download format of the digital content item comprises identifying a format of the digital content item suitable for use on the first device.

3. The method of claim 1, wherein identifying for the second device a second download format of the digital content item comprises identifying a format of the digital content item suitable for use on the second device.

4. The method of claim 1, wherein receiving a request from a user to purchase a digital content item comprises receiving a request to purchase a digital content item under terms defining a quantity of devices to which the user may download the digital content item.

5. The method of claim 4, wherein receiving a request to purchase a digital content item under terms defining a quantity of devices comprises receiving a request to purchase a digital content item under terms defining a single device to which the user may download the digital content item; and wherein downloading the digital content item in the second download format to the second device comprises prompting the user to purchase an additional license prior to downloading the digital content item.

6. The method of claim 4, wherein receiving a request to purchase a digital content item under terms defining a quantity of devices comprises receiving a request to purchase a digital content item under terms defining an unlimited number of devices to which the user may download the digital content item.

7. The method of claim 1, wherein determining the digital content item is to be downloaded to a first device comprises monitoring a queue of requests to download digital content and determining that parameters for downloading the digital content item are satisfied.

8. The method of claim 1, wherein determining the digital content item is to be downloaded to a first device comprises identifying the user wishes to download the digital content item to the first device, and determining the digital content item is to be downloaded to a second device comprises identifying the user wishes to download the digital content item to the second device.

9. The method of claim 8, wherein identifying the user wishes to download the digital content item to the first device comprises receiving a request from the first device specifying to download the digital content item to the first device, and identifying the user wishes to download the digital content item to the second device comprises receiving a request from the second device specifying to download the digital content item to the second device.

10. A method of downloading digital content implemented in a computing system, comprising:

receiving a request from a user to purchase a digital content item, the request defining parameters under which the digital content item is to be downloaded and specifying at least a first device and a second device to which the digital content item may be downloaded;

storing in a database of information, information identifying the first device and the second device are associated with the user;

monitoring conditions to determine when the conditions are consistent with the parameters under which the digital content item is to be downloaded;

upon determining the conditions are consistent with the parameters under which the digital content item is to be downloaded:

querying the database of information, the database comprising for each of a plurality of devices: a unique identifier; a type of readable content; an optimal format for readable content; and a storage location in computing memory at which content items should be stored;

identifying from the database a first download format for the first device, the first download format associated in the database with a unique identifier associated with the first device and specifying an optimal format for readable content on the first device;

identifying from the database a first storage location in computing memory on the first device at which the digital content item is to be stored upon download, the storage location associated in the database with a unique identifier associated with the first device;

identifying from the database a second download format for the second device, the second download format associated in the database with a unique identifier associated with the second device and specifying an optimal format for readable content on the second device;

identifying from the database a second storage location in computing memory on the second device at which the digital content item is to be stored upon download, the storage location associated in the database with a unique identifier associated with the second device; and downloading the digital content item to the first storage location on the first device in the first download format and downloading the digital content item to the second storage location on the second device in the second download format.

11. The method of claim 10 wherein downloading the digital content item to the first device in a first download format comprises downloading the digital content item in a format optimized for the first device.

12. The method of claim 10, wherein receiving a request from a user to purchase a digital content item, the request defining parameters under which the digital content item is to be downloaded comprises receiving a request defining parameters to download a digital content item when the first device becomes available to receive the digital content item, and wherein monitoring conditions to determine when the conditions are consistent with the parameters under which the digital content item is to be downloaded comprises monitoring conditions to identify the first device is available to receive the digital content item.

13. The method of claim 10, wherein the first download format and the second download format are different.

14. The method of claim 13, wherein receiving a request from a user to purchase a digital content item, the request defining parameters under which the digital content item is to be downloaded, comprises storing the parameters in a database, and wherein monitoring conditions to determine when the conditions are consistent with the parameters under which the digital content item is to be downloaded comprises monitoring a queue of requests and associated parameters.

15. The method of claim 11, wherein the parameters under which the digital content item is to be downloaded comprise conditions that should exist at the first device prior to downloading.

16. A system for managing downloads of purchased digital content, comprising:

a store of digital content items;

a user database comprising records of users authorized to download items from the store of digital content items, the database comprising for each authorized user an identification of digital content items purchased by the user, and for each purchased digital content item by each user an identification of at least a first device and a second device to which the digital content item may be downloaded;

a database of device information comprising for each of the first device and the second device: a unique identifier; a type of readable content; an optimal format for readable content; a communication path with the first device; and a storage location in computing memory at which content items should be stored upon download; and servers comprising computer instructions to:

receive requests from a user to download digital content items from said store to the first device, determine if information in the user database indicates a requesting user has purchased a requested digital content item under terms that allow for downloading to the first device;

searching the database of device information to identify:

a first download format for the first device, the first download format associated in the database with a unique identifier associated with the first device and specifying an optimal format for readable content on the first device;

a first communication path with the first device, the communication path associated in the database with a unique identifier associated with the first device; and a first storage location in computing memory on the first device at which the digital content item is to be stored, the first storage location associated in the database with a unique identifier associated with the first device; and download the requested digital content item in the first downloadable format to the first storage location on the first device upon determining that the requesting user purchased requested digital content item under terms that allow for downloading.

17. The system of claim 16, wherein said servers further comprise instructions to:

search the database of device information to identify for the second device:

a second download format for the digital content item, the second download format associated in the database with a unique identifier associated with the second device and specifying an optimal format for readable content on the second device, a second communication path with the second device, the communication path associated in the database with a unique identifier associated with the second device; and a second storage location on the second device at which the digital content item is to be stored, the second storage location associated in the database with a unique identifier associated with the second device; and download the requested digital content item to the second storage location on the second device in the second download format upon determining that the requesting user purchased the requested digital content item under terms that allow for downloading.

18. The system of claim 16, wherein said servers further comprise instructions to receive a request to purchase a digital content item under terms defining a quantity of devices to which the user may download the digital content item, and update said user database to reflect the user that made the request, the requested digital content item, and the terms defining a quantity of devices to which the user may download the digital content item.

19. The system of claim 16, wherein said user database comprises entries for a user indicating the user purchased a first digital content item under terms allowing for the first digital content item to be downloaded to a plurality of devices.

20. The system of claim 16, wherein said store of digital content items comprises a plurality of different media types.

* * * * *